US009364840B2

(12) United States Patent
Kyugo

(10) Patent No.: US 9,364,840 B2
(45) Date of Patent: Jun. 14, 2016

(54) POWDER DISTRIBUTION DEVICE

(75) Inventor: Masaru Kyugo, Fujimino (JP)

(73) Assignee: NISSHIN SEIFUN GROUP INC., Chiyoda-Ku, Tokyo (JP)

( * ) Notice: Subject to any disclaimer, the term of this patent is extended or adjusted under 35 U.S.C. 154(b) by 67 days.

(21) Appl. No.: 13/884,487

(22) PCT Filed: Oct. 14, 2011

(86) PCT No.: PCT/JP2011/073634

§ 371 (c)(1), (2), (4) Date: May 9, 2013

(87) PCT Pub. No.: WO2012/066884

PCT Pub. Date: May 24, 2012

(65) Prior Publication Data

US 2013/0221129 A1 Aug. 29, 2013

(30) Foreign Application Priority Data

Nov. 16, 2010 (JP) ................................ 2010-256054

(51) Int. Cl.
*A01C 3/06* (2006.01)
*B05B 7/14* (2006.01)

(52) U.S. Cl.
CPC ............ *B05B 7/1404* (2013.01); *B05B 7/1477* (2013.01)

(58) Field of Classification Search
CPC ............................ B05B 7/1404; B05B 7/1477
USPC ........... 239/311, 318, 654, 655, 662; 406/153
See application file for complete search history.

(56) References Cited

U.S. PATENT DOCUMENTS 3,926,377 A * 12/1975 Johnson ................. A01C 17/00 239/655
5,190,082 A * 3/1993 Watson .................... B68G 7/06 141/1
7,607,451 B2 * 10/2009 Haas ......................... B01F 3/06 137/268

FOREIGN PATENT DOCUMENTS

JP 60248516 * 9/1985 ............ B65G 53/04
JP 60-248516 A 12/1985
JP 62-25166 A 2/1987
JP 08-226620 A 9/1996
JP 61-157533 U 9/1996
JP 2003-21309 A 1/2003
JP 2010-145071 A 7/2010

* cited by examiner

*Primary Examiner* — Len Tran
*Assistant Examiner* — Joel Zhou
(74) *Attorney, Agent, or Firm* — Muncy, Geissler, Olds & Lowe, P.C.

(57) ABSTRACT

A powder distribution device comprises a distribution chamber having a cylindrical shape, a powder introduction pipe extending along a central axis of the distribution chamber and adapted to introduce powder to an inside of the distribution chamber through an introduction port facing the distribution chamber, swirling gas flow generating unit that generates a swirling gas flow flowing about the central axis of the distribution chamber in the distribution chamber, a plurality of powder distribution paths communicating with an outer peripheral surface of the distribution chamber, and a slit formed at a communicating portion between each of the plurality of powder distribution paths and the distribution chamber.

4 Claims, 6 Drawing Sheets

POWDER DISTRIBUTION DEVICE

TECHNICAL FIELD

The present invention relates to a powder distribution device, particularly to an apparatus for distributing powder with use of a swirling gas flow.

BACKGROUND ART

Conventionally, in the industrial field, the agricultural field, the food industry, and the like, there are cases where distribution of powder to be processed to multiple places is performed. Apparatuses adapted to perform such distribution are described in Patent Literature 1 and Patent Literature 2. Each of those apparatuses has a distribution chamber having a cone shape with its apex directed downward, generates a swirling gas flow in the distribution chamber and introduces powder conveyed by air from the apes toward an upper portion in the distribution chamber, so as to distribute the powder through a plurality of discharge ports that are radially arranged with respect to the distribution chamber.

CITATION LIST

Patent Literature

Patent Literature 1: JP 62-025166 A
Patent Literature 2: JP 2010-145071 A

SUMMARY OF INVENTION

Technical Problems

However, when powder is distributed in such a conical distribution chamber with its apex directed downward as stated in Patent Literature 1 and Patent Literature 2, the powder is sometimes adhered to a conical surface forming the inner wall, of the distribution chamber. In particular, for instance, fine powder such as sub-micron sized particulates with a particle size of less than 1 μm is prone to be adhered to the conical surface and agglomerated to form agglomerates with a large particle size. If the thus-formed agglomerates fall away from the conical surface and mixed in the fine powder, it makes difficult to carry out distribution as desired and, since a particle size distribution of the distributed powder varies, it may adversely affect in subsequent processes.

It is an object of the present invention to solve the conventional problems and provide a powder distribution device that can perform desired distribution while preventing agglomerates from being formed, even when processing fine powder.

Solution to Problems

A powder distribution device according to the invention comprises a distribution chamber having a cylindrical shape, a powder introduction pipe extending along a central axis of the distribution chamber and adapted to introduce powder to an inside of the distribution chamber through an introduction port facing the distribution chamber, swirling gas flow generating unit that generates a swirling gas flow flowing about the central axis of the distribution chamber in the distribution chamber, a plurality of powder distribution paths communicating with an outer peripheral surface of the distribution chamber, and a slit formed at a communicating portion between each of the plurality of powder distribution paths and the distribution chamber.

Preferably, the swirling gas flow generating unit includes a compressed gas introduction chamber having a cylindrical shape, formed at an outer periphery of the powder introduction pipe, and communicating with the distribution chamber, a plurality of nozzles arranged along a periphery of the compressed gas introduction chamber, adapted to inject a compressed gas into an inside of the compressed gas introduction chamber to generate a gas flow swirling in a peripheral direction, and a compressed gas supply source adapted to supply a compressed gas to the plurality of nozzles.

More preferably, a height from a bottom surface of the distribution chamber to the introduction port of the powder introduction pipe is at least ½ of an inner diameter of the distribution chamber and equal to or smaller than a height from the bottom surface of the distribution chamber to the plurality of nozzles.

The swirling gas flow generated by the swirling gas flow generating unit preferably has a flow rate of at least ½ of a flow rate of a total gas flowing in the powder distribution device.

When the plurality of powder distribution paths are arranged so as to radially extend with respect to the central axis of the distribution chamber, the structure of the powder distribution device can be compact. The device, however, may be formed in various shapes depending on a type of powder to be processed.

Advantageous Effects of Invention

The present invention is configured to generate a swirling gas flow in a cylindrical-shaped distribution chamber, introduce powder into the distribution chamber through a powder introduction pipe extending along the central axis of the distribution chamber, and distribute the powder to a plurality of powder distribution paths communicating with an outer peripheral surface of the distribution chamber through slits, which makes it possible to perform desired distribution while preventing agglomerates from being formed, even when processing fine powder.

DESCRIPTION OF EMBODIMENT

The present invention will be explained in detail based on an embodiment illustrated in the accompanying drawings.

Figure 1:
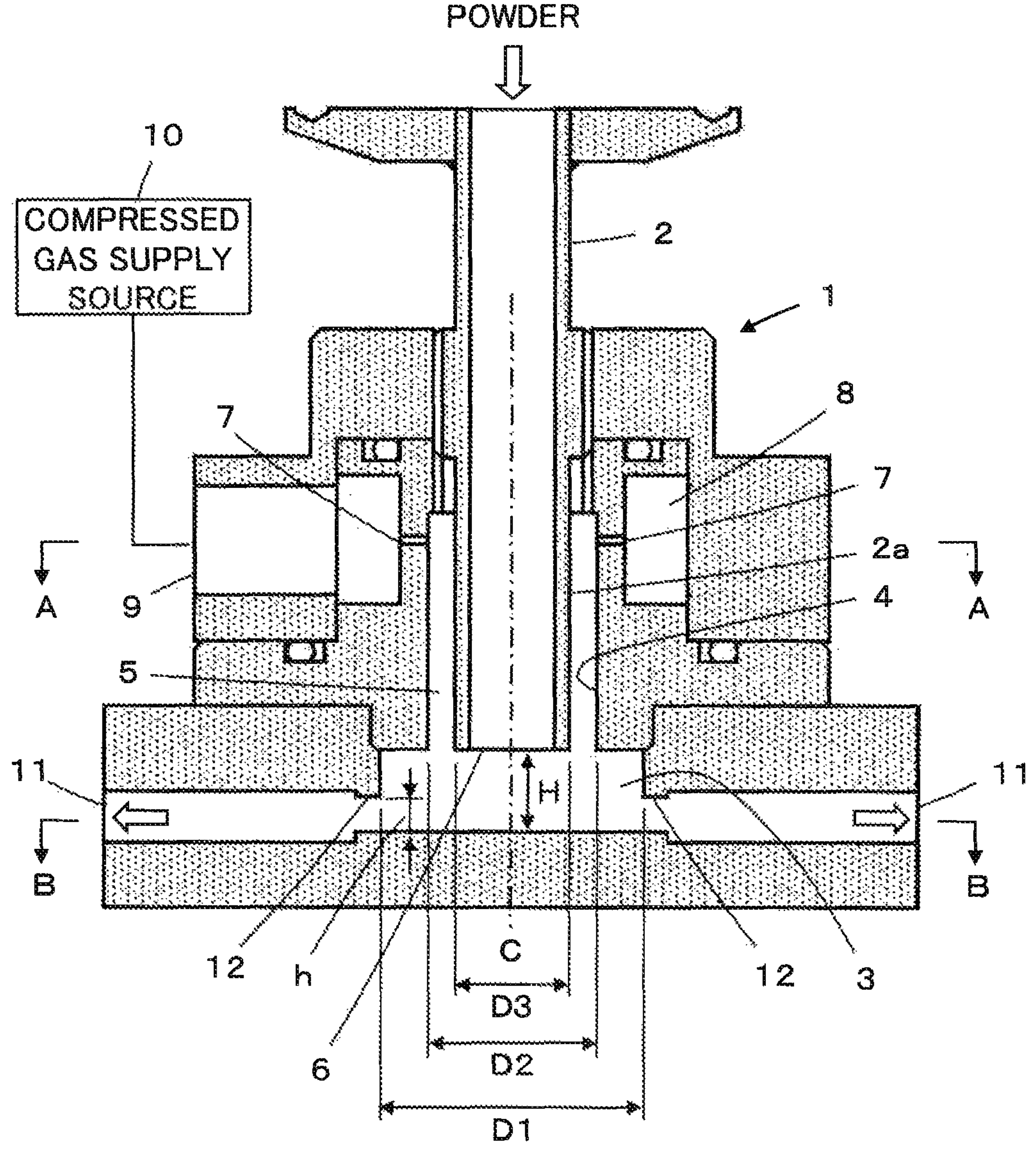
FIG. 1 is a front cross-sectional view showing a configuration of a powder distribution device according to an embodiment of the present invention.

FIG. 1 illustrates a configuration of a powder distribution device according to the embodiment. The powder distribution device includes a casing 1 and a powder introduction pipe 2 installed to the casing 1.

The casing 1 is formed at the lower portion with a low-height, cylindrical-shaped distribution chamber 3 so that its central axis C is in the vertical direction, and a through hole 4 having a circular shape in cross-section is formed to extend from the top of the casing 1 to the distribution chamber 3 along the central line C of the distribution chamber 3. The powder introduction pipe 2 is inserted into the through hole 4 from the top so that an inner peripheral surface of an upper portion of the through hole 4 is threadedly engaged or fitted with an outer peripheral surface of a middle portion of the powder introduction pipe 2, thereby fixing the powder introduction pipe 2 to the casing 1.

The distribution chamber 3 has an inner diameter D1; the through hole 4 has an inner diameter D2 smaller than the inner diameter D1 of the distribution chamber 3; and the powder introduction pipe 2 has an outer diameter D3 smaller than the inner diameter D2 of the through hole 4.

As a result, a cylindrical-shaped compressed gas introduction chamber 5 communicating with the distribution chamber 3 is formed at the outer periphery of a lower portion 2*a* of the powder introduction pipe 2, and a powder introduction port 6 formed at the bottom of the powder introduction pipe 2 is positioned to face the distribution chamber 3. The upper end of the compressed gas introduction chamber 5 is closed by the engagement or the fit of the inner peripheral surface of the through hole 4 of the casing 1 and the outer peripheral surface of the powder introduction pipe 2.

The casing 1 is also formed with a plurality of nozzles 7 at the outer periphery of the compressed gas introduction chamber 5 so as to face the compressed gas introduction chamber 5, and a ring-shaped gas pool 8 is formed at the outer periphery of the nozzles 7, so that the gas pool 8 communicates with the compressed gas introduction chamber 5 through the nozzles 7. Further, a gas supply port 9 is formed to communicate with the gas pool 8, and a compressed gas supply source 10 is connected to the gas supply port 9.

The casing 1 is further formed with a plurality of powder distribution paths 11 communicating with the outer peripheral surface of the distribution chamber 3, and a slit 12 is formed at a communicating portion where each powder distribution path 11 communicates with the distribution chamber 3. The slit 12 has a height h smaller than that of the inside of the distribution chamber 3 and that of the powder distribution path 11.

Figure 2:
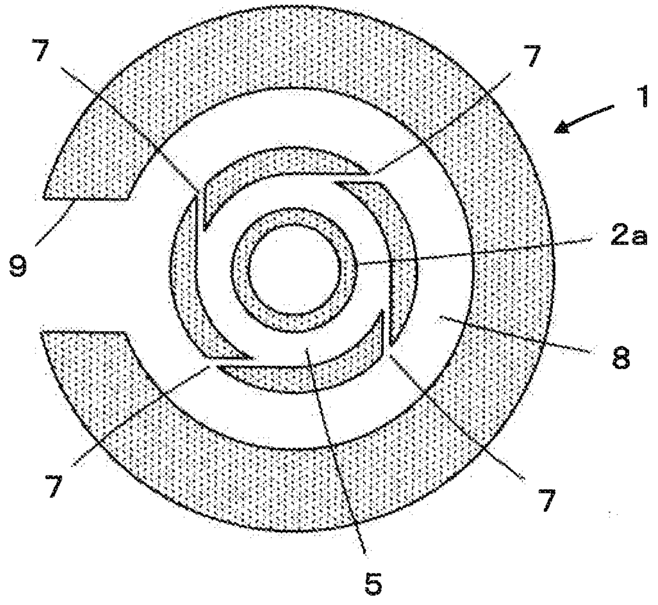
FIG. 2 is a cross-sectional view taken along a line A-A of FIG. 1.

As shown in FIG. 2, the nozzles 7 are arranged at regular intervals along the periphery of the compressed gas introduction chamber 5 and extend in the tangential direction of the cylindrical-shaped compressed gas introduction chamber 5. Accordingly, a compressed gas supplied from the compressed gas supply source 10 to the gas pool 8 through the gas supply port 9 is injected into the compressed gas introduction chamber 5 in the tangential direction through the nozzles 7 to thereby generate a swirling gas flow in the compressed gas introduction chamber 5. In this embodiment, as the plurality of nozzles 7, four nozzles 7 are provided.

Figure 3:
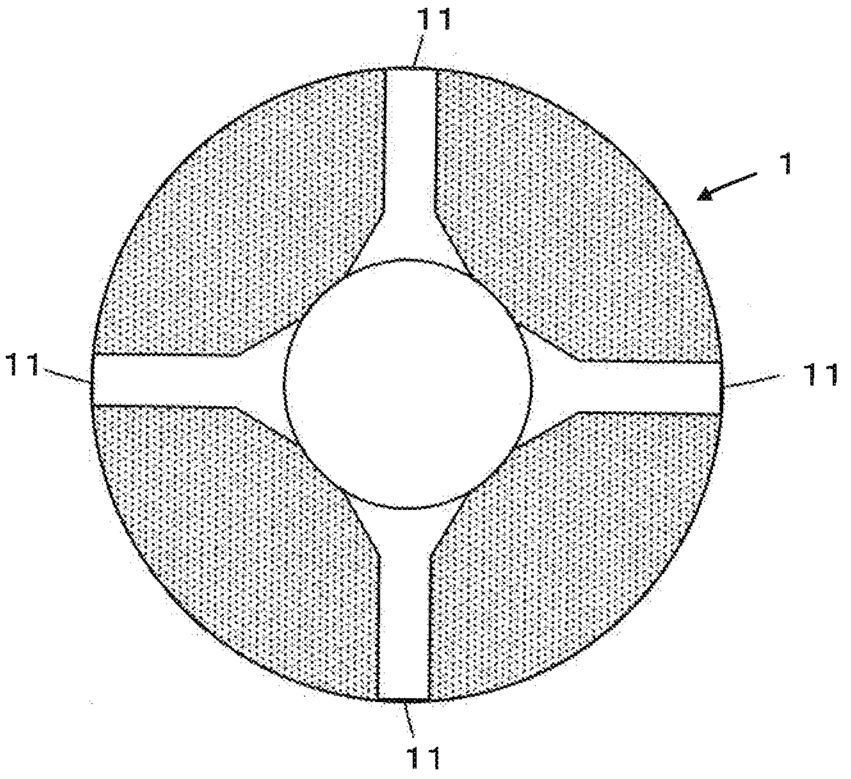
FIG. 3 is a cross-sectional view taken along a line B-B of FIG. 1.

As shown in FIG. 3, the powder distribution paths 11 are each connected to the distribution chamber 3, and have a substantially-rectangular shape at the connected portion in a cross-section when viewed from the path side, and then a circular shape in a cross-section. The powder distribution paths 11 radially extend with respect to the central axis C of the distribution chamber 3 and open at the outer peripheral surface of the casing 1. In this embodiment, as the plurality of powder distribution paths 11, four paths 11 are provided. In other words, they constitute the powder distribution device that distributes powder in four directions.

Next, the operation of the powder distribution device according to the embodiment will be explained.

When a compressed gas is continuously supplied to the gas supply port 9 from the compressed gas supply source 10, the compressed gas flows into the gas pool 8 from the gas supply port 9 and is injected into the compressed gas introduction chamber 5 through the four nozzles 7. Since the four nozzles 7 are arranged to extend in the tangential direction of the cylindrical-shaped compressed gas introduction chamber 5, the compressed gas having passed through the nozzles 7 generates a swirling gas flow that swirls in the compressed gas introduction chamber 5.

Since the upper end of the cylindrical-shaped compressed gas introduction chamber 5 is closed by the engagement or the fit of the inner peripheral surface of the through hole 4 of the casing 1 and the outer peripheral surface of the powder introduction pipe 2, the swirling gas flow generated in the compressed as introduction chamber 5 gradually spreads downward therein, which generates another swirling gas flow swirling about the central axis C in the distribution chamber 3, and subsequently a part of the swirling gas flow passes through the slits 12 to flow into the four powder distribution paths. Since each of the slits 12 has a height h smaller than that of the inside of the distribution chamber 3 and that of the powder distribution path 11, the gas is caused to pass through the slit 12 at high speed.

When powder to be distributed is conveyed by gas and introduced from the top of the powder introduction pipe 2, the powder falls therein and enters the distribution chamber 3 through the powder introduction port 6 formed at the bottom of the powder introduction pipe 2 to be subjected to the swirling gas flow swirling about the central axis C. Consequently, the powder is dispersed in the distribution chamber 3 and, together with a gas flow passing through the slits 12 at high speed, passes through the slits 12 to enter the powder distribution paths 11. Powder is thus distributed to the four powder distribution paths 11.

In this embodiment, the configuration employs not a conventional distribution chamber having a cone shape with its apex directed downward but a swirling gas flow generated in the cylindrical-shaped distribution chamber 3 so as to distribute powder through the slits 12 to the four powder distribution paths 11 communicating with the outer peripheral surface of the distribution chamber 3, which makes it possible to adequately distribute powder while preventing the powder from being adhered to the inner wall of the distribution chamber 3 and being agglomerated, even when processing fine powder with a small particle size.

It should be noted that a cylindrical-shaped slit 12 may be formed along the outer periphery of the distribution chamber 3 so that the powder distribution paths 11 communicate with the slit 12, or that a plurality of slits 12 may be provided for the respective powder distribution paths 11 communicating with the distribution chamber 3.

Powder to be distributed may be fine powder such as submicron sized particulates with a particle size of less than 1 μm, and may be various types of powder from low-density powder such as of silica and toner to high-density powder such as of a metal and alumina.

A compressed gas to be supplied from the compressed gas supply source 10 may be a compressed air and, depending on powder to be distributed, may be an inert gas, for instance.

While the distribution chamber 3 is connected to the four powder distribution paths 11 to distribute powder in four directions in the foregoing embodiment, the invention is not limited thereto and a powder distribution device may be configured to distribute powder in two, three, five or more directions in the same manner. Thus, forming a plurality of powder distribution paths 11 as radially extending with respect to the central axis of the distribution chamber 3 can lead to the compact structure of the powder distribution device. The powder distribution paths 11 may be formed in various shapes depending on a type of powder to be processed.

Figure 4:
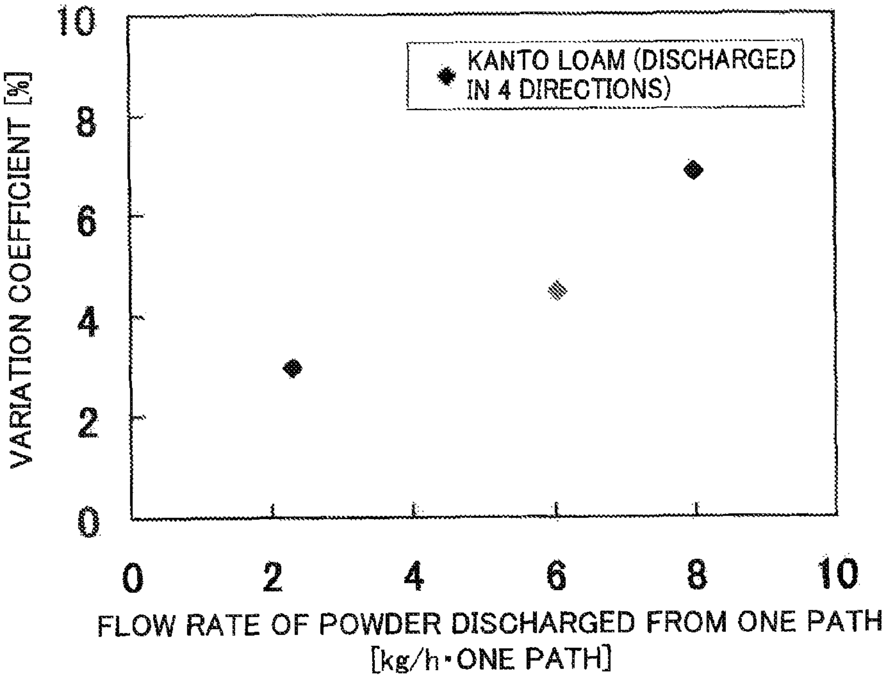
FIG. 4 is a graph showing the relationship between a variation coefficient and a flow rate of powder discharged from one path in the powder distribution device according to the embodiment.

With use of the Kanto loam powder as test powder, the relationship between a variation coefficient and a flow rate of powder discharged from one of the powder distribution paths when the powder was distributed in four directions in the powder distribution device according to the foregoing embodiment, was measured and the result was obtained as shown in FIG. 4. Regardless of the flow rate of discharged powder, favorable distributions were performed.

Figure 5:
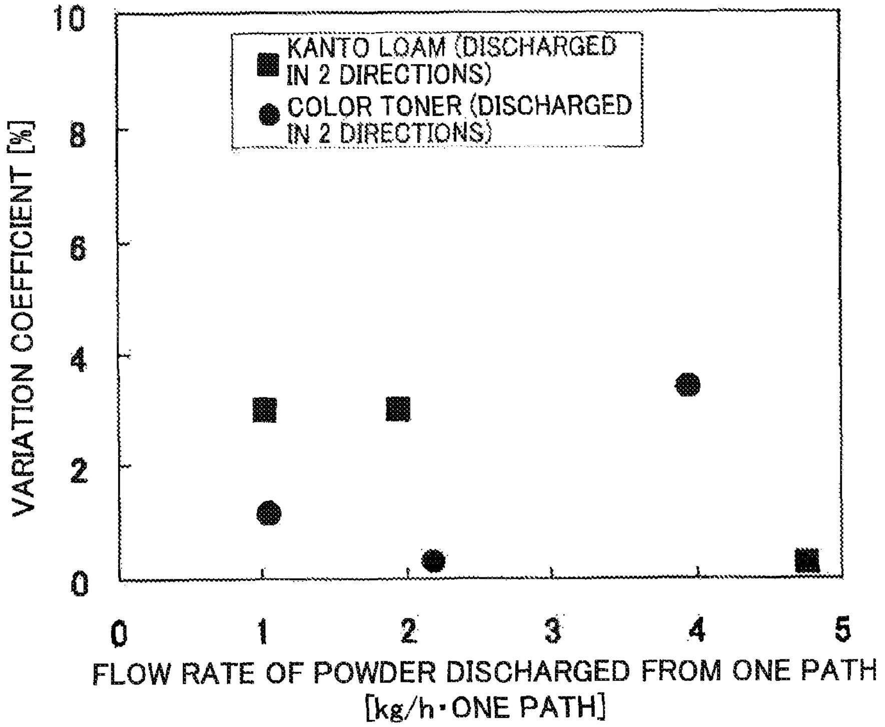
FIG. 5 is a graph showing the relationship between a variation coefficient and a flow rate of powder discharged from one path in an alternative powder distribution device.

In an alternative powder distribution device configured to distribute powder in two directions in the same manner as the foregoing embodiment, the relationship between a variation coefficient and a flow rate of powder discharged from one of the powder distribution paths was measured and the result was obtained as shown in FIG. 5. The Kanto loam powder and color toner were used as test powder. It can be seen that favorable distributions were performed with both the Kanto loam powder and the color toner, even when the flow rate of discharged powder varied.

Figure 6:
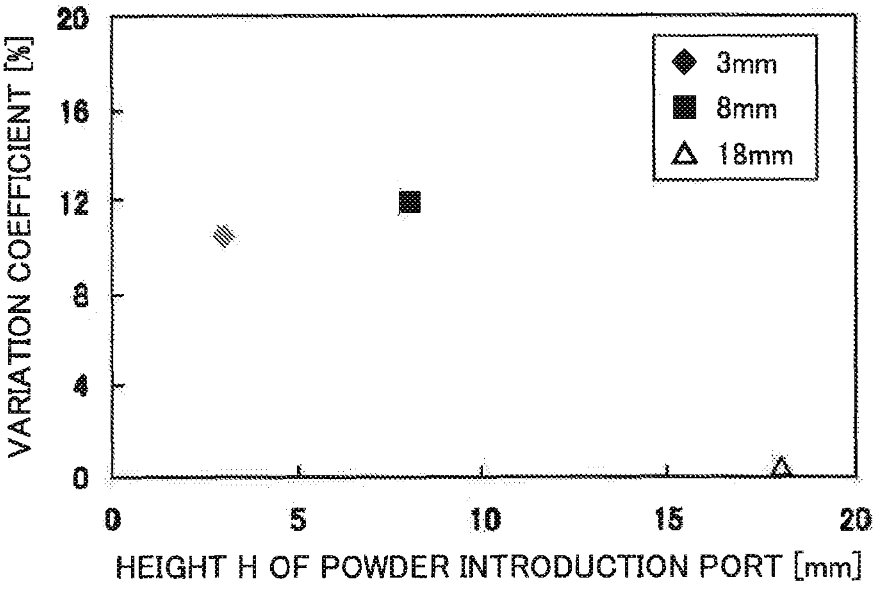
FIG. 6 is a graph showing the relationship between a variation coefficient and a height of a powder introduction port in the powder distribution device of the embodiment.

Further, experiments for measuring variation coefficients were carried out with a changed height H of the powder introduction port 6, i.e., with the height H from the bottom surface of the distribution chamber 3 to the powder introduction port 6 at the bottom of the powder introduction pipe 2 being changed to 3 mm, 8 mm and 18 mm, and the result was obtained as shown in FIG. 6. Here, D1 was 30 mm, pressure of compressed air supplied to the gas supply port 9 from the compressed gas supply source 10 was 0.4 MPa, pressure of conveying air used to supply powder from the powder introduction pipe 2 was 0.6 MPa, and a flow rate of supplied powder was 2 kg/h. At that time, when the number of the nozzles 7 was four and the diameter of each nozzle 7 was 1.0 mm, the flow rate of compressed air was 160 liters/min; and when the diameter of each nozzle 7 was 1.2 mm, the flow rate of compressed air was 240 liters/min.

The variation coefficient varied depending on the height H of the powder introduction port 6. In the shown experiment environment, of three heights H, the height H of 18 mm was optimal as illustrated.

Figure 7:
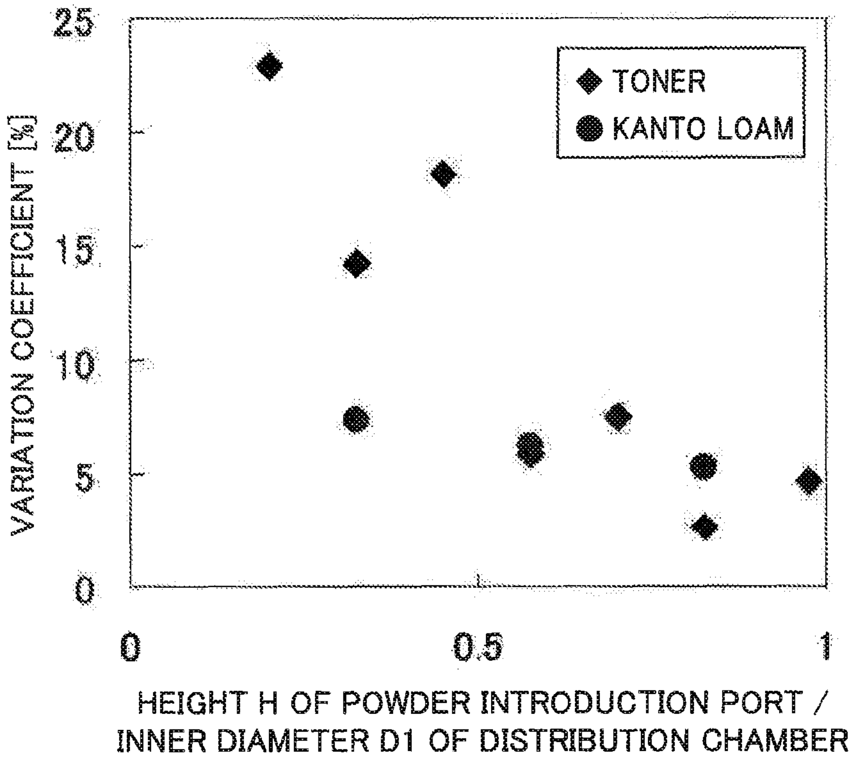
FIG. 7 is a graph showing the relationship between a variation coefficient and a ratio of a height of the powder introduction port to an inner diameter of the distribution chamber in the powder distribution device of the embodiment.

Furthermore, the relationship between a variation coefficient and a variously-changed ratio of a height H of the powder introduction port 6 to an inner diameter D1 of the distribution chamber 3 with the inner diameter D1 set to 40 mm, was measured and the result was obtained as shown in FIG. 7. The Kanto loam powder and toner having an average particle size of 5.3 μm were used as test powder. When the ratio represented by H/D1 was 0.5 or more, i.e., when the height H from the bottom surface of the distribution chamber 3 to the powder introduction port 6 was at least ½ of the inner diameter D1 of the distribution chamber 3, favorable distributions were confirmed with both the Kanto loam powder and the color toner. As an upper limit of the height of the powder distribution port 6, the height H from the bottom surface of the distribution chamber 3 to the powder introduction port 6 is preferably equal to or smaller than a height from the bottom surface of the distribution chamber 3 to the nozzles 7 for use in generating a swirling gas flow.

Figure 8:
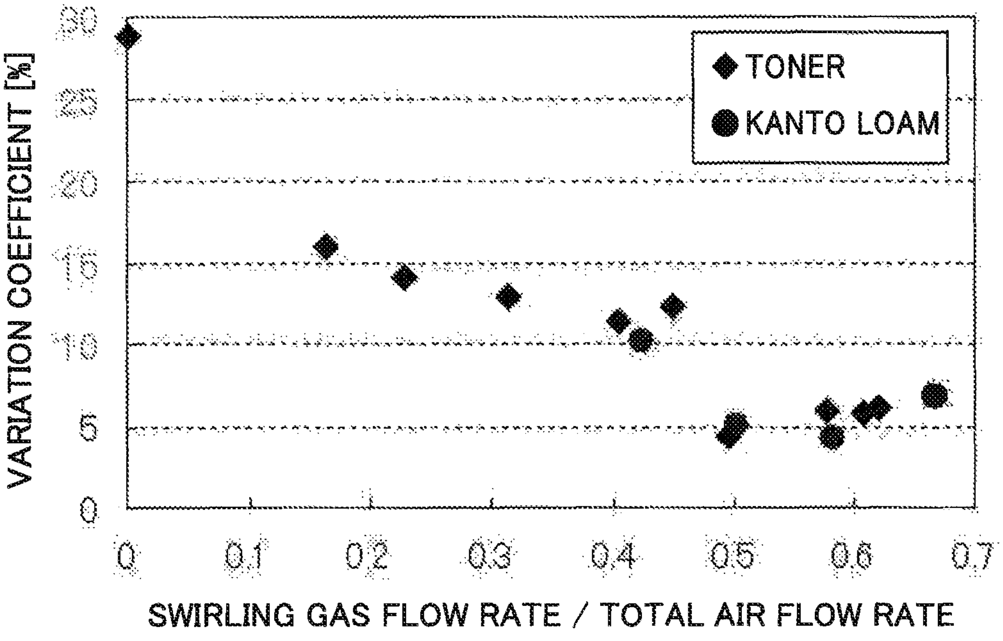
FIG. 8 is a graph showing the relationship between a variation coefficient and a ratio of a swirling gas flow rate to a total air flow rate in the powder distribution device of the embodiment.

Furthermore, the relationship between a variation coefficient and a variously-changed ratio of a swirling gas flow rate to a flow rate of total gas flowing in the powder distribution device according to the foregoing embodiment was measured and the result was obtained as shown in FIG. 8. The Kanto loam powder with an average particle size of 2 μm and a particle density of 2.9 g/cm$^3$ and toner with an average particle size of 5.3 μm and a particle density of 1.2 g/cm$^3$ were used as test powder. When the ratio of the swirling gas flow rate to the flow rate of total air in the powder distribution device was ½ or more, favorable distributions were confirmed with both the Kanto loam powder and the toner.

Figure 9A:
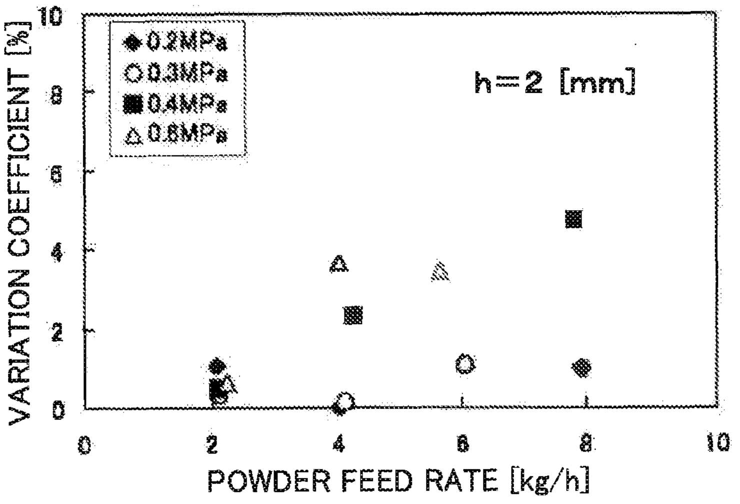
FIGS. 9A to 9C illustrate the relationship between a variation coefficient and a powder feed rate in the powder distribution device of the embodiment with a slit height of 2 mm, 4 mm and 8 mm, respectively.
Figure 9B:
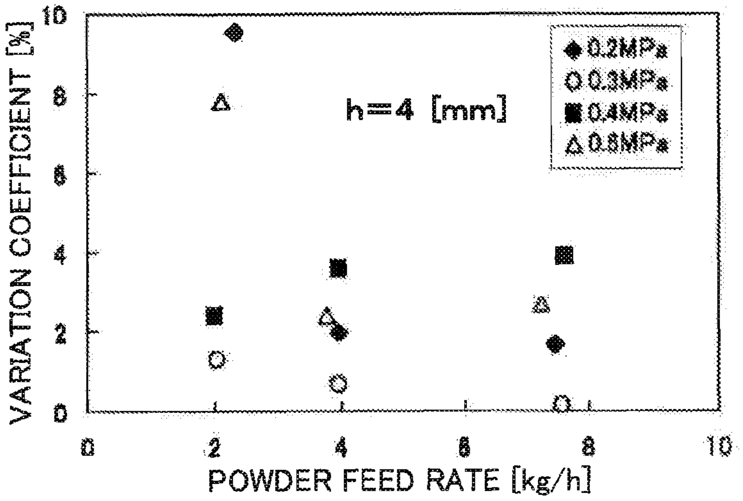
Figure 9C:
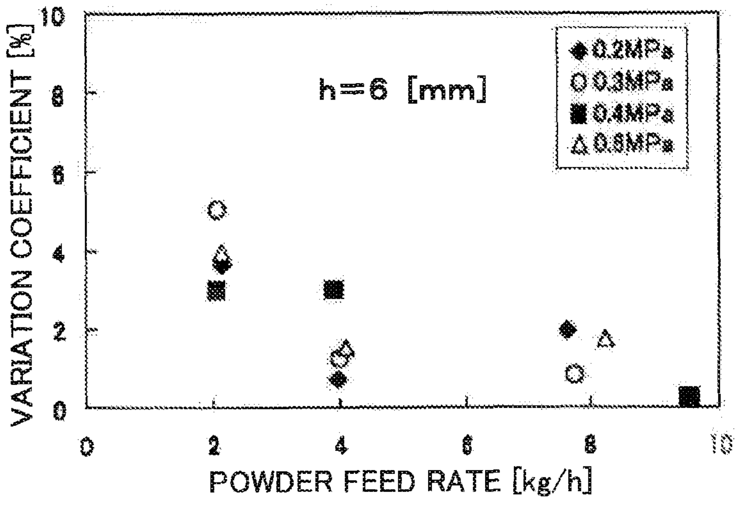

Aside from the above, variation coefficients were measured with a height h of the slit 12 being changed to 2 mm, 4 mm and 6 mm and also with pressure of compressed air supplied to the gas supply port 9 from the compressed gas supply source 10 and a flow rate of supplied powder being variously changed. Here, pressure of conveying air for use in supplying powder from the powder introduction pipe 2 was set to 0.6 MPa, pressure of compressed air supplied to the gas supply port 9 from the compressed gas supply source 10 was changed to 0.2 MPa, 0.3 MPa, 0.4 MPa and 0.6 MPa, and a flow rate of supplied powder was changed within a range of 2 kg/h to 10 kg/h. FIGS. 9A, 9B and 9C illustrate the measurement results with the height h of the slit 12 of 2 mm, 4 mm and 6 mm, respectively.

It can be seen from those measurement results that the variation coefficients varied in a different fashion depending on changes in the height h of the slit 12, the pressure of compressed air and the flow rate of supplied powder. For instance, in the case where the pressure of compressed air was 0.4 MPa, which is indicated by black squares in FIGS. 9A, 9B and 9C, when the feed rate of supplied powder was 2 kg/h, the optimal height h of the slit 12 among three examples was 2 mm; and when the flow rate of supplied powder was 8 to 10 kg/h, the optimal height h was 6 mm.

As can be seen from the measurement results in FIGS. 6, 7, 8, 9A, 9B and 9C, the optimal environments for distribution seem to separately exist in terms of a variety of factors including pressure of compressed air to be supplied to the gas supply port 9, pressure of conveying air for use in supplying powder from the powder introduction pipe 2, a feed rate of supplied powder, a height H from the bottom surface of the distribution chamber 3 to the powder introduction port 6, a swirling gas flow rate, and a height h of the slit 12, as well as a material and a particle size of powder, and the like.

Consequently, it is preferable to set the respective factors capable of establishing the optimal environment in accordance with individual process conditions, and perform powder distribution.

REFERENCE SIGNS LIST

1 Casing, 2 Powder introduction pipe, 2*a* Lower portion of the powder introduction pipe, 3 Distribution chamber, 4 Through hole, 5 Compressed gas introduction chamber, 6 Powder introduction port, 7 Nozzle, 8 Gas pool, 9 Gas supply port, 10 Compressed gas supply source, 11 Powder distribution path, 12 Slit, C Central axis, D1 Inner diameter of the distribution chamber, D2 Inner diameter of the through hole, D3 Outer diameter of the powder introduction pipe 2, H Height from the bottom surface of the distribution chamber to the powder introduction port, h Height of the slit.

The invention claimed is:

1. A powder distribution device comprising: a distribution chamber having a cylindrical inner wall in which a plurality of slits for passage of powder are formed; a powder introduction pipe extending along a central axis of the distribution chamber and adapted to introduce powder to an inside of the distribution chamber through an introduction port facing the distribution chamber; a swirling gas flow generating unit that generates a swirling gas flow flowing about the central axis of the distribution chamber in the distribution chamber along the cylindrical inner wall in which the plurality of slits are formed to prevent powder from being adhered to the cylindrical inner wall and being agglomerated; a plurality of powder distribution paths communicating with the plurality of slits of the distribution chamber; and each of the plurality of slits having a cross-sectional area smaller than that of each of the plurality of powder distribution paths thereby reducing an opening area in a surface of the cylindrical inner wall of the distribution chamber to suppress an attenuation of the swirling gas flow formed in the distribution chamber; wherein the swirling gas flow generating unit includes: a compressed gas introduction chamber having a cylindrical shape, formed at an outer periphery of the powder introduction pipe, and communicating with the distribution chamber; a plurality of nozzles arranged along a periphery of the compressed gas introduction chamber, adapted to inject a compressed gas into an inside of the compressed gas introduction chamber to generate a gas flow swirling in a peripheral direction; and a compressed gas supply source adapted to supply a compressed gas to the plurality of nozzles.

2. The powder distribution device according to claim 1, wherein a height from a bottom surface of the distribution chamber to the introduction port of the powder introduction pipe is at least ½ of an inner diameter of the distribution chamber and equal to or smaller than a height from the bottom surface of the distribution chamber to the plurality of nozzles.

3. The powder distribution device according to claim 1, wherein the swirling gas flow generated by the swirling gas flow generating unit has a flow rate of at least ½ of a flow rate of a total gas flowing in the powder distribution device.

4. The powder distribution device according to claim 1, wherein the plurality of powder distribution paths are arranged so as to radially extend with respect to the central axis of the distribution chamber.

* * * * *